United States Patent [19]

Schultschik

[11] Patent Number: 4,551,044
[45] Date of Patent: Nov. 5, 1985

[54] RADIALLY ADJUSTABLE TOOL HEAD OF A CUTTING MACHINE

[75] Inventor: Robert Schultschik, Uster, Switzerland

[73] Assignee: Werkzeugmaschinenfabrik Oerlikon-Bührle AG, Zürich, Switzerland

[21] Appl. No.: 488,534

[22] Filed: Apr. 25, 1983

[30] Foreign Application Priority Data

May 3, 1982 [CH] Switzerland .................... 2697/82

[51] Int. Cl.⁴ ........................................... B23B 29/034
[52] U.S. Cl. .................................. 408/185; 408/197; 82/2 E
[58] Field of Search .............. 408/197, 181, 147, 154, 408/155, 183, 156, 139, 185, 714; 409/144; 82/2 E; 29/568; 407/76, 88, 91

[56] References Cited

U.S. PATENT DOCUMENTS

| | | |
|---|---|---|
| 3,215,474 | 11/1965 | Martin et al. |
| 3,371,559 | 3/1968 | Scholl . |
| 3,486,401 | 12/1969 | Kelm ................................... 408/181 |
| 3,635,572 | 1/1972 | Robinson ............................. 408/181 |
| 3,715,167 | 2/1973 | Ollearo ................................ 408/197 |
| 3,877,329 | 4/1975 | Noa ..................................... 408/35 |
| 4,055,095 | 10/1977 | Gramespacher et al. ............. 29/568 |
| 4,419,807 | 12/1983 | Moulin ................................ 29/568 |

Primary Examiner—Leonidas Vlachos
Assistant Examiner—Jerry Kearns
Attorney, Agent, or Firm—Werner W. Kleeman

[57] ABSTRACT

In the radially adjustable tool head there is provided a radially adjustable slide serving to accommodate a cutting tool. The slide is arranged to slide on a spindle insert at guiding members containing guiding or guide surfaces which slide in pairs upon each other. To positively retain the slide on the spindle insert springs are arranged in such a manner and with a pre-bias such that the guiding surfaces are pressed against each other. Also, structure is provided to interrupt, when desired, the transmission of the pre-bias to the guiding surfaces.

13 Claims, 2 Drawing Figures

RADIALLY ADJUSTABLE TOOL HEAD OF A CUTTING MACHINE

CROSS REFERENCE TO RELATED APPLICATION

This application is related to the commonly assigned, copending U.S. patent application Ser. No. 06/488,601, filed Apr. 25, 1983, entitled "Apparatus For Automatically Displacing The Radial Position Of A Cross-Feed Slide In A Cross-Feed Head Of A Cutting Machine".

BACKGROUND OF THE INVENTION

The present invention relates to a new and improved construction of a radially adjustable tool or boring head of a cutting machine, also sometimes referred to as a boring and facing head.

In its more particular aspects, the radially adjustable tool or boring head of the present development is of the type comprising a spindle insert, a radially adjustable slide serving to accommodate a cutting tool, and guiding or guide means arranged between the spindle insert and the slide and containing guiding or guide surfaces which slide in pairs upon one another.

In a radially adjustable tool head known in practice the structure is as generally described hereinbefore and there is provided a radially adjustable slide which is continuously displaceable during rotation of the radially adjustable tool head on a spindle. A displacement mechanism for the slide comprises differential gearing. During rotation of the spindle a displacement magnitude in the form of a timewise limited rotational speed difference can be inputted to the differential gearing, in order to thereby activate the displacement mechanism of the slide.

There is not ensured in such type of radially adjustable tool or boring head that the radially adjustable slide will stay in a predetermined position under high loads. Such a radially adjustable tool head, therefore, is better suited for finish-machining operations than for roughing operations.

SUMMARY OF THE INVENTION

Therefore, with the foregoing in mind it is a primary object of the present invention to provide a new and improved construction of a radially adjustable tool or boring head which enables the radially adjustable slide to be positively retained at the spindle insert in each desired position.

Now in order to implement this and still further objects of the invention, which will become more readily apparent as the description proceeds, the radially adjustable tool or boring head of the present development is manifested by the features that, there are provided springs containing a pre-bias which are arranged to press the guiding or guide surfaces against each other, and means are provided to interrupt the transmission of the pre-bias of the springs to the guiding surfaces.

The advantages achieved by the invention essentially reside in the features that the radially adjustable tool or boring head according to the invention is also suited to be used for roughing operations. The particular type of clamping of the radially adjustable slide furthermore permits the clamping action to also be automatically released. The radially adjustable slide according to the invention thus can be used in an arrangement for automatically displacing the radial position of a radially adjustable slide in a radially adjustable tool head of a cutting machine.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
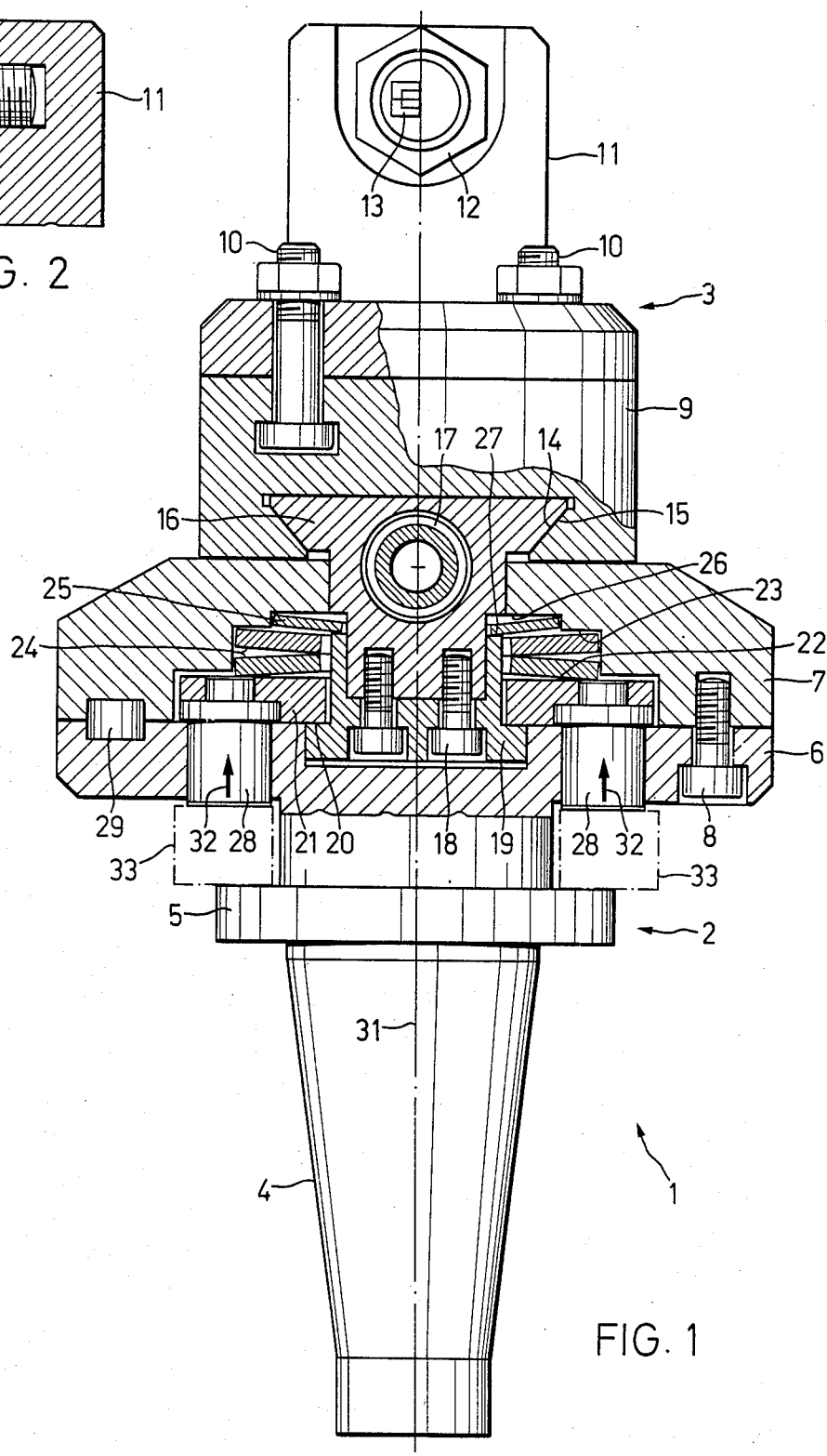
FIG. 1 shows a radially adjustable tool head constructed according to the invention partially in sectional view.

FIG. 1 shows, partially in section, a radially adjustable tool or boring head 1. The radially adjustable tool head comprises a spindle insert 2 and a radially adjustable slide 3. The spindle insert 2 contains a cone or conical portion 4 by means of which such spindle insert 2 may be inserted into a conventional tool receiving device of spindles. A collar 5 is arranged at one end of the cone 4. A flange 6 is provided at a distance from the collar 5. The flange 6 is screwed to a housing 7 by means of threaded bolts or screws 8. Above the housing 7 there will be recognized a slide 9 which is connected by threaded bolts or screws 10 to a tool carrier 11. A cutting tool 13 is arranged in a tool insert 12 which may be screwed into the tool carrier 11.

The slide 9 comprises guiding or guide surfaces 14 supported at corresponding guiding or guide surfaces 15 at a guiding or guide element 16. A spindle 17 is arranged within the guiding element 16 and is mounted in the housing 7 at its ends in a manner which is known, and, therefore, not here shown in any detail. An also not particularly shown but conventional entrainment member engages with the threads on the spindle 17 and connects the spindle 17 to the slide 9 through the guiding element 16. Furthermore, the guiding element 16 is screwed by threaded bolts or screws 18 to a flange member 19. This flange member 19 is form-lockingly connected via a contact surface 20 with a ring member or body 21 which encloses the flange member 19. Biased or pre-stressed plate springs 24 are arranged between a top or upper surface 22 at the ring member 21 and an inner surface or shoulder 23 at the housing 7. A further plate spring 25 having a smaller spring constant than the plate springs 24 is supported at a further inner surface 26 at the housing 7, on the one hand, and at an end face or surface 27 at the flange member 19, on the other hand, however, has a smaller spring pre-bias or pre-stress. Bolts 28 are supported at the ring member 21 at one of their opposed or opposite ends while the other ends thereof protrude beyond the flange or flange member 6. Since the radially adjustable tool or boring head 1 rotates when in use, a spindle axis 31 has been shown in the drawing. A pin 29 or equivalent structure serves to exactly position the housing 7 and the flange 6 with respect to each other.

Figure 2:
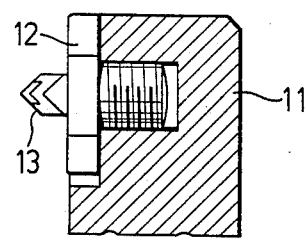
FIG. 2 is a view of part of the radially adjustable tool head shown in FIG. 1.

FIG. 2 is a view of part of the tool carrier 11. Again the tool insert 12 and the cutting tool 13 will be recognized.

The ring member 21 is urged away from the housing 7 by the bias or pre-bias of the plate springs 24. The ring member 21 transfers the spring pre-bias via the contact surface 20 to the flange member 19, and thus, also to the guiding or guide element 16. Accordingly, by virtue of the pre-bias of the plate springs 24, there are pressed against one another the housing 7, the slide 9, the guiding element 16 including the flange member 19 and the ring member 21 as well as the guiding surfaces 14 and 15.

By raising or displacing the bolts 28 in the direction of the arrow 32 the ring member 21 is also lifted, so that the plate springs 24 are further compressed. However, the plate spring 25 still urges the flange member 19 including the guiding or guide element 16 away from the inner surface 26. Therefore, the ring member 21 and the flange member 19 no longer contact each other at the contact surface 20. Thus, the guiding or guide surfaces 14 and 15 are no longer loaded with the pre-bias of the plate springs 24. These guide surfaces 14 and 15 are only pressed against each other by the small pre-bias of the plate spring 25, so that there is just no play between these surfaces. In this position the radially adjustable slide 3 now can be readily displaced by rotating the spindle 17 relative to the housing 7. The bolts 28 together with the ring member 21 form means for interrupting the transmission of the pre-bias of the springs 24 to the guiding or guide surfaces 14 and 15. By releasing the bolts 28 all the parts or members return into their original position and the radially adjustable slide 3 is fixedly clamped to the housing 7. Each bolt 28 is lifted in the direction of the arrow 32 preferably by means of a wedge member or wedge fork 33 which is shown in section by dash-dotted or phantom lines in the drawings. The wedge member or wedge fork 33 is arranged at the cutting machine and is inserted transversely with respect to the spindle axis 31 between the bolt 28 and the collar 5. Due to the wedge-shaped design of the wedge member or wedge fork 33 the bolts 28 are displaced in the direction of the arrow 32 when the same is inserted. The wedge member or wedge fork 33 completes the aforementioned means to interrupt the transfer of the spring pre-bias or pre-stress.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A radially adjustable tool head for a cutting machine, comprising:
   a spindle insert defining a spindle axis;
   a radially adjustable slide supported by said spindle insert and provided with guiding surfaces, with means for mounting a cutting tool and with means for radially adjusting said radially adjustable slide in relation to said spindle axis;
   a guiding element arranged between said spindle insert and said radially adjustable slide for axial movement substantially parallel to said spindle axis and containing guiding surfaces upon which slide associated ones of said guiding surfaces provided at said radially adjustable slide;
   spring means loaded with a pre-bias between said guiding element and said spindle insert and arranged to press said guiding surfaces of said guiding element against said guiding surfaces at said radially adjustable slide; and
   means movable substantially parallel to said spindle axis for interrupting the transmission of said spring pre-bias to said guiding surfaces in order to enable a motion of said guiding element substantially parallel to said spindle axis which is prerequisite for radial adjustment of said radially adjustable slide by said means for radially adjusting said radially adjustable slide.

2. The radially adjustable tool head as defined in claim 1, further including:
   at least one additional spring cooperating with said guiding element;
   said spring means comprise springs of a higher spring constant and said at least one additional spring comprises a spring of a lower spring constant; and
   said springs of said spring means and said at least one additional spring being arranged such that said interrupting means interrupt the transmission of the pre-bias of said springs to said guiding element only with respect to said springs of said spring means which have said higher spring constant.

3. The radially adjustable tool head as defined in claim 1, wherein:
   said spring means comprises plate springs arranged concentrically with respect to said spindle axis.

4. The radially adjustable tool head as defined in claim 1, wherein:
   said interrupting means comprise bolt means and a ring member cooperating with said bolt means.

5. The cross-feed head as defined in claim 4, wherein:
   said spindle insert contains a collar member arranged substantially concentrically with respect to said spindle axis and a flange; and
   said collar member being arranged at an axial distance from said flange.

6. The radially adjustable tool head as defined in claim 1, wherein:
   said guiding element is arranged to be spring-loaded by said spring means and to be movable in the direction of said spindle axis under spring load.

7. The radially adjustable tool head as defined in claim 1, wherein:
   said means for radially adjusting said slide constitute a spindle traversing said guiding element.

8. A radially adjustable tool head for a cutting machine, comprising:
   a spindle insert defining a spindle axis;
   a radially adjustable slide supported by said spindle insert and containing means for mounting a cutting tool;
   said radially adjustable slide having guide surfaces and being capable of radial adjustment by adjusting means;
   guiding means arranged between said spindle insert and said radially adjustable slide and containing guide surfaces upon which slide associated ones of said guide surfaces of said radially adjustable slide;
   spring means loaded with a pre-bias between said guiding means and said spindle insert and arranged to press said guiding surfaces of said guiding means against said associated guide surfaces of said radially adjustable slide;
   at least one additional spring cooperating with said guiding means;
   said spring means comprise springs of a higher spring constant and said at least one additional spring comprising a spring of a lower spring constant;
   means movable substantially parallel to said spindle axis for interrupting the transmission of said spring bias to said guiding surfaces in order to enable a motion of said guiding means substantially parallel to said spindle axis; and said spring means and said at least one additional spring being arranged such that said interrupting means interrupt the transmission of the pre-bias to said guiding surfaces only with respect to said springs of said spring means which have said higher spring constant.

9. The radially adjustable tool head as defined in claim 8, wherein:

said spring means comprises plate springs arranged concentrically with respect to said spindle axis.

10. The radially adjustable tool head as defined in claim 8, wherein:

said interrupting means comprise bolt means and a ring member cooperating with said bolt means;

said spindle insert contains a collar member arranged substantially concentrically with respect to said spindle axis and a flange member;

said collar member being arranged at an axial distance from said flange member; and lifting means insertable between said collar member and said bolt means of said interrupting means in order to lift said bolt means and to thereby interrupt said transmission of said spring pre-bias to said guiding surfaces.

11. The radially adjustable tool head as defined in claim 10, wherein:

said guiding means comprise a guiding element containing said guiding surfaces of said guiding means; and said guiding element being arranged to be spring-loaded by said springs of said higher spring constant of said spring means and to be movable in the direction of said spindle axis under spring load.

12. A radially adjustable tool head for a cutting machine, comprising:

a spindle insert defining a spindle axis;

a collar member provided on said spindle insert for mounting said spindle insert in a spindle of the cutting machine and arranged substantially concentrically with respect to said spindle insert;

a flange provided at said spindle insert and axially spaced from said collar member in a direction substantially parallel to said spindle axis;

a housing mounted on said flange and containing a first inner surface and a second inner surface;

a radially adjustable slide slidably seated against said housing and having means for mounting a cutting tool;

said radially adjustable slide containing adjusting means for radially adjusting said radially adjustable slide relative to said spindle axis;

said radially adjustable slide being provided with guiding surfaces;

a guide element movably projecting into said housing and having an outer side and an inner side;

said guide element containing on said outer side thereof guiding surfaces coacting with said guiding surfaces provided at said radially adjustable slide;

a flange member provided at said guide element on said inner side thereof and defining a contact surface;

said guide element and said flange member provided thereat movably projecting coaxially with said spindle axis into said housing in such a manner that said guide element which movably projects into said housing is releasably fixable;

spring means arranged between said housing and a body member arranged within said housing;

said spring means and said body member being held in a pre-biased condition between said first inner surface of said housing and said contact surface of said flange member;

at least one additional spring member having a smaller spring constant than said spring means;

said at least one additional spring member being arranged and permanently pre-biased between said guide element and said second inner surface of said housing;

bolt means defining opposed ends;

said bolt means bearing with one of their opposed ends against said body member;

said bolt means being displaceably guided in said flange of said spindle insert; and lifting means coacting with said collar member of said spindle insert in order to lift said bolt means and to thereby interrupt the force of said spring means which act upon said guide element.

13. The radially adjustable tool head as defined in claim 12, wherein:

said spring means and said at least one additional spring member comprise plate springs concentrically arranged with respect to said spindle axis; and said body member constituting a ring member.

* * * * *